United States Patent
Cai et al.

(10) Patent No.: US 11,436,709 B2
(45) Date of Patent: Sep. 6, 2022

(54) THREE-DIMENSIONAL RECONSTRUCTION METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yuzhan Cai, Beijing (CN); Chao Zheng, Beijing (CN); Chao Yan, Beijing (CN); Hantian Zhang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 84 days.

(21) Appl. No.: 17/082,761

(22) Filed: Oct. 28, 2020

(65) Prior Publication Data
US 2021/0304371 A1    Sep. 30, 2021

(30) Foreign Application Priority Data
Mar. 27, 2020    (CN) .......................... 202010228206.5

(51) Int. Cl.
*G06T 5/00*    (2006.01)
*G06T 7/80*    (2017.01)
*G06T 7/73*    (2017.01)

(52) U.S. Cl.
CPC ............... *G06T 5/006* (2013.01); *G06T 7/75* (2017.01); *G06T 7/80* (2017.01); *G06T 2207/10028* (2013.01)

(58) Field of Classification Search
CPC .. G06T 5/006; G06T 7/75; G06T 7/80; G06T 2207/10028; G06T 7/579; G06T 17/00; G06T 2207/30244
See application file for complete search history.

(56) References Cited

U.S. PATENT DOCUMENTS

2015/0373326 A1*  12/2015  Hebei .................. H04N 19/147
                                                    375/240.03
2017/0270647 A1*   9/2017  Zhou ....................... G06T 5/005
(Continued)

FOREIGN PATENT DOCUMENTS

CN    110264502 A  *  9/2019  ............... G06T 7/30
WO    2019045722 A1    3/2019

OTHER PUBLICATIONS

Extended European Search Report for Application No. 20215968.7, dated Jun. 1, 2021, 11 pages.
(Continued)

*Primary Examiner* — Chan S Park
*Assistant Examiner* — Daniel C Chang
(74) *Attorney, Agent, or Firm* — Fay Sharpe LLP

(57) ABSTRACT

The disclosure provides a 3-dimensional reconstruction method, an electronic device and a storage medium. The method includes: obtaining an image sequence pre-collected by a camera; obtaining nominal intrinsic parameters of the camera, and preset initial values of distortion coefficients of the camera, the camera being a camera for collecting the image sequence; calculating fluctuation ranges of the distortion coefficients; performing the 3D reconstruction on the image sequence based on the nominal intrinsic parameters, the initial values of the distortion coefficients, and the fluctuation ranges of the distortion coefficients; and during the 3D reconstruction, optimizing an obtained visual point cloud and a camera pose.

16 Claims, 2 Drawing Sheets

(56) References Cited

U.S. PATENT DOCUMENTS

2018/0150693 A1* 5/2018 Guo .................. G06V 20/48
2021/0118160 A1* 4/2021 Farås .................. G06T 7/55

OTHER PUBLICATIONS

Nima Keivan et al., "Online SLAM with Any-time Self-calibration and Automatic Change Detection", 2015 IEEE International Conference on Robotics and Automation (ICRA), Washington State Convention Center, May 26, 2015, 8 pages.

Kurt Cornelis et al. "Lens Distortion Recovery for Accurate Sequential Structure and Motion Recovery", ECCV 2002, LNCS 2351, pp. 186-200, Apr. 29, 2002.

Nicola Fioraio et al., "Joint Detection, Tracking and Mapping by Semantic Bundle Adjustment", Jun. 23, 2013 IEEE Conference on Computer Vision and Pattern Recognition, 8 pages.

* cited by examiner

THREE-DIMENSIONAL RECONSTRUCTION METHOD, ELECTRONIC DEVICE AND STORAGE MEDIUM

CROSS-REFERENCE TO RELATED APPLICATION

This application claims priority to Chinese Patent Application No. 202010228206.5, filed on Mar. 27, 2020, the entire contents of which are incorporated herein by reference for all purpose.

TECHNICAL FIELD

The present disclosure relates to a field of image processing technologies, especially a field of high-precision map technologies, and more particularly, to a 3-dimensional (3D) reconstruction method, an electronic device and a storage medium.

BACKGROUND 3D image reconstruction technologies refer to technologies of estimating camera parameters and locations of visual point clouds from an image sequence based on multi-view geometric principle. Currently, 3D reconstruction methods rely on calibrated intrinsic parameters of a camera, but in some scenes, the intrinsic parameters of the camera are not calibrated. Therefore, the calibrated intrinsic parameters of the camera could not be obtained during the 3D reconstruction, which leads to problems during the 3D reconstruction, such as low reconstruction accuracy, and divergence in optimization.

SUMMARY

In a first aspect, the present disclosure provides a 3D reconstruction method. The method includes: obtaining an image sequence pre-collected by a camera; obtaining nominal intrinsic parameters of the camera, and preset initial values of distortion coefficients of the camera, the camera being a camera for collecting the image sequence; calculating fluctuation ranges of the distortion coefficients; performing the 3D reconstruction on the image sequence based on the nominal intrinsic parameters, the initial values of the distortion coefficients, and the fluctuation ranges of the distortion coefficients; and during the 3D reconstruction, optimizing an obtained visual point cloud and a camera pose.

In a second aspect, the present disclosure provides an electronic device. The electronic device includes: at least one processor, and a memory coupled to the at least one processor. The memory stores instructions executable by the at least one processor, and when the instructions are executed by the at least one processor, the at least one processor are caused to implement the method according to the first aspect.

In a third aspect, the present disclosure provides a non-transitory computer-readable storage medium storing computer instructions thereon, in which the computer instructions are used to make the computer implement the method according to the first aspect.

Additional effects of the above-mentioned manners will be described below in combination with specific embodiments.

BRIEF DESCRIPTION OF THE DRAWINGS

The accompanying drawings are used to better understand the solution, and do not constitute a limitation on the application, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

The present disclosure provides a 3D reconstruction method. This method is applicable for 3D reconstruction of an image sequence without calibrated intrinsic parameters of a camera, or 3D reconstruction of an image sequence with calibrated intrinsic parameters of a camera.

Figure 1:
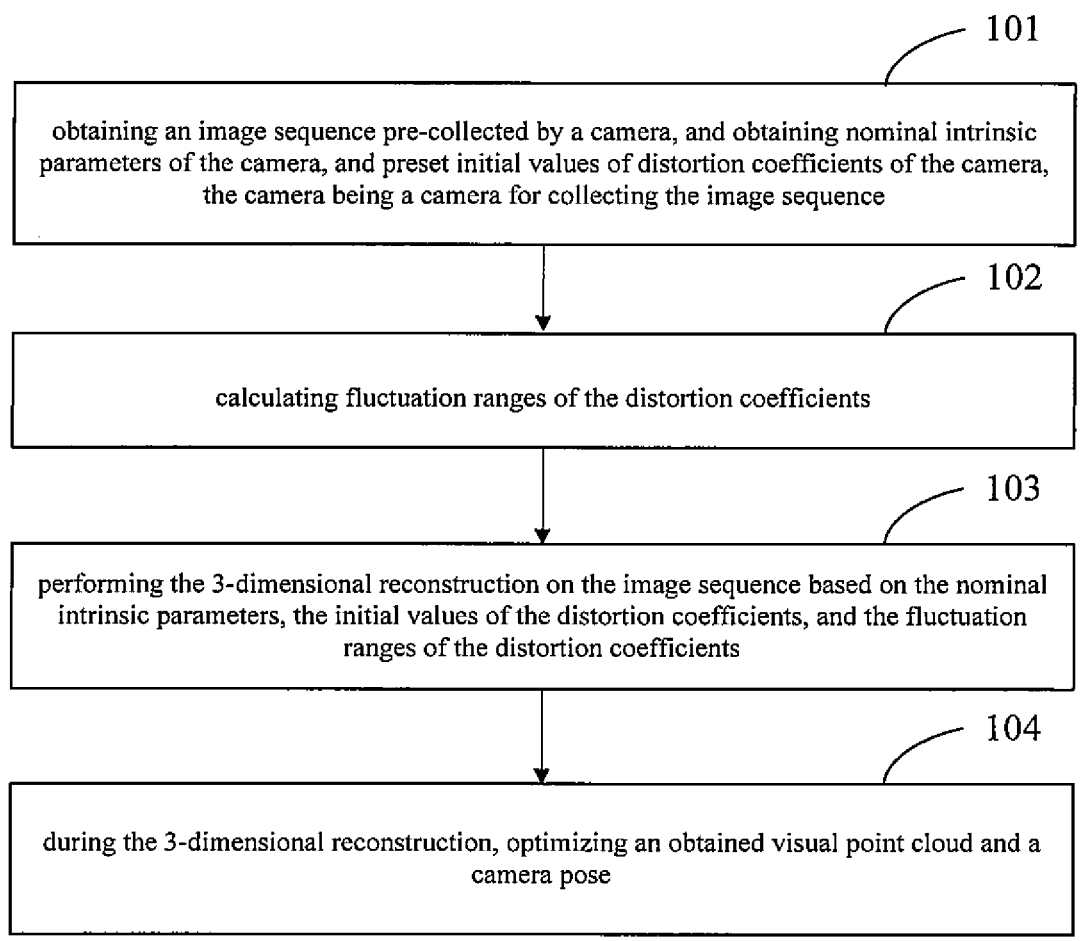
FIG. 1 is a flowchart of a 3D reconstruction method according to an embodiment of the present disclosure.

As illustrated in FIG. 1, the 3D reconstruction method includes the following steps.

At step 101, an image sequence pre-collected by a camera is obtained, and nominal intrinsic parameters of the camera, and preset initial values of distortion coefficients of the camera are obtained.

The above image sequence refers to an image sequence to be three-dimensionally reconstructed. Before performing 3D reconstruction, the pre-collected image sequence needs to be input, that is, the pre-collected image sequence needs to be obtained. The "camera" mentioned in this disclosure refers to the camera that collects the above image sequence, that is, the above image sequence is pre-collected by the "camera" in this disclosure.

If the camera that collects the image sequence has not been calibrated, then when performing the 3D reconstruction of the image sequence, the nominal intrinsic parameters of the camera could not be obtained. Based on the current 3D reconstruction technologies, the image sequence may not be three-dimensionally reconstructed. The term "calibrated intrinsic parameters" refers to the intrinsic parameters obtained by calibrating the camera. For example, the cameras currently installed in vehicles are generally cameras that have not been calibrated. Therefore, images collected by the vehicles are generally images without calibrated intrinsic parameters of the camera.

On the basis, this disclosure considers the nominal intrinsic parameters of the camera as the initial values of the intrinsic parameters of the camera. The term "nominal intrinsic parameters" refers to the design values of the intrinsic parameters of the camera. Generally, the intrinsic parameters of the camera are easy to obtain, and camera manufacturers generally provide the intrinsic parameters. In the case that the calibrated intrinsic parameters of the camera could not be obtained, the relevant initial values need to be optimized during the 3D reconstruction to improve the accuracy of the 3D reconstruction. The optimization of the 3D reconstruction is essentially a nonlinear optimization. Therefore, in order to facilitate subsequent optimization, relatively good initial values are selected. Since the errors between the nominal intrinsic parameters of the camera and the true values are within a certain range, it is more advantageous to use the nominal intrinsic parameters of the camera as the initial values for subsequent optimization.

In the disclosure, the nominal intrinsic parameters of the camera include a nominal focal length and a nominal optical center value of the camera.

Due to the distortion coefficients of the camera, the pre-collected image sequence also has a certain degree of distortion. When the 3D reconstruction is performed on the image sequence, the distortion of the image sequence has a certain impact on the accuracy of the 3D reconstruction. Therefore, the distortion coefficients are optimized during the 3D reconstruction. In this disclosure, before performing the 3D reconstruction on the image sequence, in addition to considering the nominal intrinsic parameters of the camera as the initial values of the 3D reconstruction, the initial values of the distortion coefficients of the camera are preset, and the preset initial values of the distortion coefficients are considered as the initial values of the 3D reconstruction.

As for the distortion coefficients, since the distortion mainly occurs at the edges of the image, when performing the 3D reconstruction on the image sequence, only the features of the central area of the image are considered to minimize the distortions and reduce the effect of the distortions on the 3D reconstruction. For example, the edges of the image are appropriately cut during the 3D reconstruction, or only the features of the central area of the image are extracted, and feature extraction is not performed on the edge areas of the image.

Through the above process, since the distortions are minimized, the initial values of the distortion coefficients are 0. That is, if 3D reconstruction is performed on the target area of each image of the image sequence, the initial values of the distortion coefficients are 0, and the target area does not include the edge areas of the image.

At step 102, fluctuation ranges of the distortion coefficients of the camera are calculated.

The distortion coefficients of the camera generally fluctuate within proper ranges, and the above-mentioned fluctuation ranges of the distortion coefficients refer to the ranges in which the distortion coefficients fluctuate.

In the 3D reconstruction of the image sequence, the distortion coefficients are limited according to the fluctuation ranges of the distortion coefficients, which accelerates the convergence of the 3D reconstruction and improves the accuracy of the 3D reconstruction.

In view of this, before performing the 3D reconstruction on the image sequence, the fluctuation ranges of the distortion coefficients of the camera are determined in advance, and the fluctuation ranges of the distortion coefficients are obtained by calculation (or estimation).

The following provides an implementation for calculating the fluctuation ranges of the distortion coefficients of the camera.

Optionally, calculating the fluctuation ranges of the distortion coefficients of the camera includes: extracting distorted line features of a part of images in the image sequence; and calculating the fluctuation ranges of the distortion coefficients according to the distorted line features.

In this embodiment, firstly, a part of images in the image sequence are selected from the image sequence, for example, 20 images. Secondly, this part of images are semantically segmented, and the distorted line features of this part of images are extracted, and according to the result of semantic segmentation, invalid line features are removed. Based on least square method, the fluctuation ranges of the distortion coefficients that make the corrected line features tend to be straight are determined.

In this embodiment, since the line features are easy and accurate in determining the distortions, the fluctuation ranges of the distortion coefficients are calculated by extracting the line features that are distorted in the image, which is relatively simple to implement, and the fluctuation ranges of the distortion coefficients calculated are precise.

At step 103, the 3D reconstruction is performed on the image sequence based on the nominal intrinsic parameters, the initial values of the distortion coefficients, and the fluctuation ranges of the distortion coefficients.

In the present disclosure, the 3D reconstruction of the image sequence is realized through feature extraction and matching. In detail, the definitive and distinguishing features of the image are extracted.

During the 3D reconstruction on the image sequence, a visual point cloud corresponding to the image sequence and a camera pose corresponding to each image of the image sequence are obtained. The visual point cloud and the camera pose obtained by the 3D reconstruction are also called a sparse model.

The following provides an implementation for 3D reconstruction of the image sequence.

Optionally, performing the 3D reconstruction on the image sequence includes: selecting a first image and a second image from the image sequence; performing the 3D reconstruction on the first image and the second image to obtain an initial visual point cloud; and registering each of new images in the image sequence to obtain a point cloud of each of the new images; and combining the point cloud of each of the new images into the initial visual point cloud.

In this embodiment, performing the 3D reconstruction on the first image and the second image to obtain the initial visual point cloud may be referred to as a point cloud initialization process. In detail, the first image and the second image are selected from the image sequence, relative poses of the first image and the second image are solved, the point clouds of the first image and the second image are generated, and the point cloud initialization is completed. In order to improve the quality of the initial visual point cloud, the first image and the second image may be typical and representative images of high quality in the image sequence.

Each of new images in the image sequence is registered to obtain a point cloud of each of the new images, and the point cloud of each of the new images is combined into the initial visual point cloud, the above process is referred to as new image registration process. In detail, based on the initial visual point cloud, other images of the image sequence are registered respectively to obtain the point cloud of each image, and the generated point clouds are combined into the initial visual point cloud until all the images of the image sequence is registered.

Optionally, the method further includes: during registering each of the new images, determining whether to optimize the distortion coefficients according to a change curve of distortion coefficient.

The aforementioned distortion coefficients refer to the distortion coefficients of the camera. In this disclosure, the distortion coefficients, focal lengths and optical center values of the camera are all intrinsic parameters.

In this embodiment, during the registration of the new images, if the change curve of distortion coefficient is relatively stable, the distortion coefficients may not be optimized; if the change curve of distortion coefficient is unstable, the distortion coefficients may be determined to be optimized.

In this embodiment, by considering whether to optimize the distortion coefficients during the registration of the new images, the accuracy of the point cloud generated during the registration of the new images is improved, and the robustness of convergence of the intrinsic parameters is improved.

At step 104, during the 3-dimensional reconstruction, an obtained visual point cloud and a camera pose are obtained.

During the 3D reconstruction, the accuracy of the 3D reconstruction is improved by optimizing the visual point cloud and the camera pose.

The above optimization of the visual point cloud and the camera pose is called BA optimization. BA optimization includes global BA optimization and local BA optimization. The global BA optimization refers to the optimization of the entire image sequence at the same time, that is, the visual point clouds and the camera poses of the images in the image sequence are optimized. Local BA optimization refers to the optimization of the visual point clouds and camera poses of the images in a certain window. For example, if the image sequence has 100 images, the obtained visual point clouds and camera poses in the certain window (such as 20 images) are optimized.

It should be noted that the execution order of the above steps is not limited. For example, step 101 and step 102 could be performed at the same time, or step 101 could be performed before step 102 can be performed, or step 102 could be performed before step 101. Also, step 104 may be performed during the execution of step 103.

In the case that the camera intrinsic parameters corresponding to the image sequence to be 3D reconstructed are not calibrated, the nominal intrinsic parameters of the camera are easy to obtain, and the errors between the nominal intrinsic parameters of the camera and the true values are within a certain range. Therefore, this disclosure considers taking the nominal intrinsic parameters of the camera as the initial values of the intrinsic parameters of the camera, and the initial values of the distortion coefficients of the camera are preset, and the fluctuation ranges of the distortion coefficients of the camera are calculated. In this way, in this disclosure, the 3D reconstruction of the image sequence is performed based on the nominal intrinsic parameters, the initial values of the distortion coefficients and the fluctuation ranges of the distortion coefficients, and the visual point cloud and the camera pose during the 3D reconstruction of the image sequence are obtained. By adopting the above-mentioned technical means, the 3D reconstruction without calibrated intrinsic parameters is realized, which makes an application scope of the 3D reconstruction technologies wider. When the distance of the 3D reconstruction is controlled within a certain length, for example, when 3D reconstruction is performed on an image sequence between 200 meters and 400 meters physically, the 3D reconstruction effect without calibrated intrinsic parameters approximates the 3D reconstruction effect with calibrated intrinsic parameters, which meets the accuracy requirements of 3D reconstruction.

In addition, it should be noted that even if the intrinsic parameters of the camera are calibrated, the intrinsic parameters of the camera change during use, and since many camera calibration scenarios have not been industrialized, errors inevitably occur in the calibrated intrinsic parameters of the camera. Therefore, this method is not only suitable for the 3D reconstruction of image sequences without calibrated intrinsic parameters, but also for the 3D reconstruction of image sequences with calibrated intrinsic parameters, and the accuracy of the 3D reconstruction with calibrated intrinsic parameters is further improved.

Optionally, the method further includes: during the 3D reconstruction, optimizing a semantic element in the obtained visual point cloud, so that a point cloud of the semantic element meets geometric features corresponding to the semantic element.

The visual point cloud obtained by the above BA optimization may still have noise. For example, the semantic elements in the visual point cloud may not meet the geometric constraints of the semantic element. For example, the point cloud of a signboard is not on the same plane, which is inconsistent with the geometric features of an actual signboard. The semantic elements may include elements such as signs, poles, road lines, and buildings.

In this embodiment, in the 3D reconstruction, in addition to BA optimization, semantic optimization is also performed, that is, the semantic elements in the obtained visual point cloud are optimized. The semantic optimization ensures that the generated point cloud of the semantic element meets the geometric features of the semantic element.

In this embodiment, by combining BA optimization and semantic optimization, the accuracy of the 3D reconstruction is further improved, and the robustness of convergence of the intrinsic parameters is improved.

Optionally, the method further includes: during the 3D reconstruction, when the fluctuation ranges of the distortion coefficients are unstable, optimizing the distortion coefficients; and when the fluctuation ranges of the distortion coefficients are stable, optimizing the nominal intrinsic parameters.

In this embodiment, in order to improve the convergence of the intrinsic parameters, the intrinsic parameters may be optimized during the 3D reconstruction.

The larger the number of internal parameters that need to be optimized, the more difficult of the optimization of the 3D reconstruction, and the poorer the robustness of the convergence of the intrinsic parameters. Therefore, the number of the intrinsic parameters that need to be optimized is minimized.

Since the nominal focal length of the camera has a good initial value, a strategy of not performing optimization in the early stage of optimization and participating in the optimization in the later stage is considered. The nominal optical center values of the camera are generally difficult to converge, and differences between true optical center locations and the nominal optical center locations are usually small, thus the impact on the 3D reconstruction is small within a certain threshold, optimization may not be performed. For the distortion coefficients, since the distortion in the center of the image is small, a single-parameter distortion model is applied for optimization.

In view of the above factors, in this embodiment, in the 3D reconstruction, in addition to BA optimization, optimization of intrinsic parameters may also be performed. According to the strategy of intrinsic parameter optimization, in the early stage of 3D reconstruction, the nominal focal length of the camera is not optimized, only the distortion coefficients are optimized to stabilize the fluctuation ranges of the distortion coefficients. After the fluctuation ranges of the distortion coefficients are stabilized, the nominal focal length of the camera is optimized. Therefore, in this embodiment, optimizing the nominal intrinsic parameters of the camera may be understood as optimizing the nominal focal lengths of the camera.

In this embodiment, by combining BA optimization and optimization of intrinsic parameters, the accuracy of the 3D reconstruction is further improved, and the robustness of convergence of the intrinsic parameters is improved.

It should be noted that during the 3D reconstruction, BA optimization could be combined with either or both of semantic optimization and intrinsic parameter optimization to further improve the accuracy of the 3D reconstruction and further improve the robustness of convergence of the intrinsic parameters. For example, during the BA optimization, if the fluctuation ranges of the distortion coefficients are unstable, the intrinsic parameter optimization may not be performed. If the fluctuation ranges of the distortion coefficients are stable, the intrinsic parameter optimization may be performed. For another example, if the convergence is achieved only by BA optimization, the semantic optimization may not be performed. If the convergence is not achieved the BA optimization, the semantic optimization may be performed.

Optionally, the image sequence is an image sequence collected by crowdsourcing.

In this embodiment, the image sequence is collected by crowdsourcing, which can reduce the difficulty and cost of acquiring the image sequence, thereby further reducing the difficulty and cost of the 3D reconstruction.

Through the above-mentioned 3D reconstruction method, when the 3D reconstruction distance is controlled within a certain length, the 3D reconstruction effect without calibrated intrinsic parameters approaches the 3D reconstruction effect with calibrated intrinsic parameters, thereby meeting the accuracy requirements of each image sequence, especially accuracy requirements of crowdsourcing update. The 3D reconstruction method in this disclosure enables the crowdsourcing update to use image sequences without calibrated intrinsic parameters, thereby greatly expanding the data source of the crowdsourcing update, expanding the application scope of the crowdsourcing update, thus the crowdsourcing update is applicable for high-precision maps.

It should be noted that various optional implementation manners in the 3D reconstruction method in this disclosure could be implemented in combination with each other or implemented separately, which is not limited in this disclosure.

The foregoing embodiments of the present disclosure have the following advantages or beneficial effects.

In the case that the intrinsic parameters of the camera corresponding to the image sequence to be three-dimensionally reconstructed are not calibrated, since the nominal intrinsic parameters of the camera are easy to obtain, and errors between the nominal intrinsic parameters of the camera and the true values are within a certain range. Therefore, in this disclosure, the nominal intrinsic parameters of the camera are considered as initial values of the intrinsic parameters of the camera, the initial values of the distortion coefficients of the camera are preset, and the fluctuation ranges of the distortion coefficients of the camera are calculated. In this way, the 3D reconstruction is performed on the image sequence based on the nominal intrinsic parameters, the initial values of the distortion coefficients, and the fluctuation ranges of the distortion coefficients, and during the 3D reconstruction, the visual point cloud and the camera pose are optimized. By adopting the above-mentioned technical means, the 3D reconstruction without calibrated intrinsic parameters is realized, which makes the application scope of the 3D reconstruction technologies wider.

Figure 2:
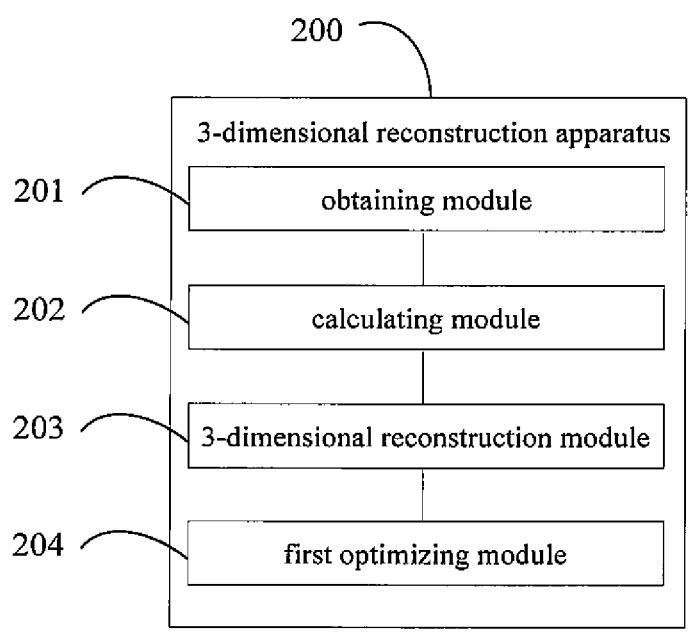
FIG. 2 is a schematic diagram of a 3D reconstruction apparatus according to an embodiment of the present disclosure.

The embodiments of the present disclosure also provide a 3D reconstruction apparatus. As illustrated in FIG. 2, the apparatus 200 includes: an obtaining module 201, a calculating module 202, a 3D reconstruction module 203 and a first optimizing module 204.

The obtaining module 201 is configured to obtain an image sequence pre-collected by a camera, and obtain nominal intrinsic parameters of the camera, and preset initial values of distortion coefficients of the camera. The camera is a camera for collecting the image sequence.

The calculating module 202 is configured to calculate fluctuation ranges of the distortion coefficients.

The 3D reconstruction module 203 is configured to perform the 3D reconstruction on the image sequence based on the nominal intrinsic parameters, the initial values of the distortion coefficients, and the fluctuation ranges of the distortion coefficients.

The first optimizing module 204 is configured to, during the 3D reconstruction, optimize an obtained visual point cloud and a camera pose.

Optionally, the apparatus 200 includes a second optimizing module. The second optimizing module is configured to, during the 3D reconstruction, optimize a semantic element in the obtained visual point cloud, so that a point cloud of the semantic element meets geometric features corresponding to the semantic element.

Optionally, the apparatus 200 further includes a third optimizing module. The third optimizing module is configured to, during the 3D reconstruction, when the fluctuation ranges of the distortion coefficients are unstable, optimize the distortion coefficients; and when the fluctuation ranges of the distortion coefficients are stable, optimize the nominal intrinsic parameters.

Optionally, the calculating module 202 includes: an extracting submodule and a calculating submodule.

The extracting submodule is configured to extract distorted line features of a part of images in the image sequence.

The calculating submodule is configured to calculate the fluctuation ranges of the distortion coefficients according to the distorted line features.

Optionally, the 3D reconstruction module 203 includes: a selecting submodule, a point cloud initialization submodule and a new image registering submodule.

The selecting submodule is configured to select a first image and a second image from the image sequence.

The point cloud initialization submodule is configured to perform the 3D reconstruction on the first image and the second image to obtain an initial visual point cloud; and The new image registering submodule is configured to register each of new images in the image sequence to obtain a point cloud of each of the new images, and combine the point cloud of each of the new images into the initial visual point cloud.

Optionally, the new image registering submodule is further configured to determine whether to optimize the distortion coefficients according to a change curve of distortion coefficient, during registering each of the new images.

Optionally, when the 3D reconstruction is performed on a target area of each image of the image sequence, the initial values of the distortion coefficients are 0, and the target area does not include an edge area of the image.

Optionally, the nominal intrinsic parameters of the camera include a nominal focal length and a nominal optical center value of the camera.

Optionally, the image sequence is an image sequence collected by crowdsourcing.

The 3D reconstruction apparatus 200 according to the present disclosure implements the various processes in the above-mentioned 3D reconstruction method embodiments implemented by the 3D reconstruction apparatus, and the same beneficial effects are achieved. In order to avoid repetition, details are not repeated here.

According to the embodiments of the present disclosure, the present disclosure also provides an electronic device and a readable storage medium.

Figure 3:
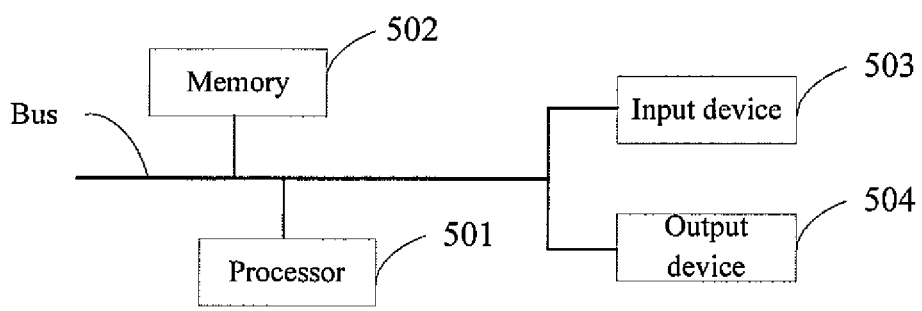
FIG. 3 is a block diagram of an electronic device used to implement the 3D reconstruction method according to an embodiment of the present disclosure.

FIG. 3 is a block diagram of an electronic device used to implement the 3-dimensional reconstruction method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 3, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 3.

The memory 502 is a non-transitory computer-readable storage medium according to the present disclosure. The memory stores instructions executable by at least one processor, so that the at least one processor executes the 3-dimensional reconstruction method according to the present disclosure. The non-transitory computer-readable storage medium of the present disclosure stores computer instructions, which are used to cause a computer to execute the 3-dimensional reconstruction method according to the present disclosure.

As a non-transitory computer-readable storage medium, the memory 502 is configured to store non-transitory software programs, non-transitory computer executable programs and modules, such as program instructions/modules corresponding to the 3-dimensional reconstruction method in the embodiment of the present disclosure (For example, the obtaining module 201, the calculating module 202, and the 3-dimensional reconstruction module 203 and a first optimizing module 204 shown in FIG. 2). The processor 501 executes various functional applications and data processing of the server by running non-transitory software programs, instructions, and modules stored in the memory 502, that is, implementing the 3-dimensional reconstruction method in the foregoing method embodiment.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device through a network. Examples of the above network include, but are not limited to, the Internet, an intranet, a local area network, a mobile communication network, and combinations thereof.

The electronic device for implementing the 3-dimensional reconstruction method may further include: an input device 503 and an output device 504. The processor 501, the memory 502, the input device 503, and the output device 504 may be connected through a bus or in other manners. In FIG. 3, the connection through the bus is taken as an example.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 404 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the present disclosure, in the case that the intrinsic parameters of the camera corresponding to the image sequence to be three-dimensionally reconstructed are not calibrated, since the nominal intrinsic parameters of the camera are easy to obtain, and errors between the nominal intrinsic parameters of the camera and the true values are within a certain range. Therefore, in this disclosure, the nominal intrinsic parameters of the camera are considered as initial values of the intrinsic parameters of the camera, the initial values of the distortion coefficients of the camera are preset, and the fluctuation ranges of the distortion coefficients of the camera are calculated. In this way, the 3D reconstruction is performed on the image sequence based on the nominal intrinsic parameters, the initial values of the distortion coefficients, and the fluctuation ranges of the distortion coefficients, and during the 3D reconstruction, the visual point cloud and the camera pose are optimized. By adopting the above-mentioned technical means, the 3D reconstruction without calibrated intrinsic parameters is realized, which makes the application scope of the 3D reconstruction technologies wider.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A 3-dimensional reconstruction method, comprising:
   obtaining an image sequence pre-collected by a camera;
   obtaining nominal intrinsic parameters of the camera, and preset initial values of distortion coefficients of the camera, the camera being a camera for collecting the image sequence;
   calculating fluctuation ranges of the distortion coefficients, comprising: extracting distorted line features of a part of images in the image sequence; and calculating the fluctuation ranges of the distortion coefficients according to the distorted line features;
   performing the 3-dimensional reconstruction on the image sequence based on the nominal intrinsic parameters, the initial values of the distortion coefficients, and the fluctuation ranges of the distortion coefficients; and
   during the 3-dimensional reconstruction, optimizing an obtained visual point cloud and a camera pose.

2. The method according to claim 1, further comprising:
   during the 3-dimensional reconstruction, optimizing a semantic element in the obtained visual point cloud, so that a point cloud of the semantic element meets geometric features corresponding to the semantic element.

3. The method according to claim 1, wherein the performing the 3-dimensional reconstruction on the image sequence comprises:
   selecting a first image and a second image from the image sequence;
   performing the 3-dimensional reconstruction on the first image and the second image to obtain an initial visual point cloud; and
   registering each of new images in the image sequence to obtain a point cloud of each of the new images; and
   combining the point cloud of each of the new images into the initial visual point cloud.

4. The method according to claim 3, further comprising:
   during registering each of the new images, determining whether to optimize the distortion coefficients according to a change curve of distortion coefficient.

5. The method according to claim 1, wherein when the 3-dimensional reconstruction is performed on a target area of each image of the image sequence, the initial values of the distortion coefficients are 0, and the target area does not comprise an edge area of the image.

6. The method according to claim 1, wherein the nominal intrinsic parameters of the camera comprise a nominal focal length and a nominal optical center value of the camera.

7. The method according to claim 1, wherein the image sequence is an image sequence collected by crowdsourcing.

8. An electronic device, comprising:
   at least one processor; and
   a memory coupled to the at least one processor; wherein, the memory stores instructions executable by the at least one processor, and when the instructions are executed by the at least one processor, the at least one processor are caused to implement the following actions:
   obtaining an image sequence pre-collected by a camera;

obtaining nominal intrinsic parameters of the camera, and preset initial values of distortion coefficients of the camera, the camera being a camera for collecting the image sequence;

calculating fluctuation ranges of the distortion coefficients, comprising: extracting distorted line features of a part of images in the image sequence; and calculating the fluctuation ranges of the distortion coefficients according to the distorted line features;

performing the 3-dimensional reconstruction on the image sequence based on the nominal intrinsic parameters, the initial values of the distortion coefficients, and the fluctuation ranges of the distortion coefficients; and during the 3-dimensional reconstruction, optimizing an obtained visual point cloud and a camera pose.

9. The electronic device according to claim 8, wherein when the instructions are executed by the at least one processor, the at least one processor are caused to further implement the following actions:

during the 3-dimensional reconstruction, optimizing a semantic element in the obtained visual point cloud, so that a point cloud of the semantic element meets geometric features corresponding to the semantic element.

10. The electronic device according to claim 8, wherein the performing the 3-dimensional reconstruction on the image sequence comprises:

selecting a first image and a second image from the image sequence;

performing the 3-dimensional reconstruction on the first image and the second image to obtain an initial visual point cloud; and registering each of new images in the image sequence to obtain a point cloud of each of the new images; and combining the point cloud of each of the new images into the initial visual point cloud.

11. The electronic device according to claim 10, wherein when the instructions are executed by the at least one processor, the at least one processor are caused to further implement the following actions:

during registering each of the new images, determining whether to optimize the distortion coefficients according to a change curve of distortion coefficient.

12. The electronic device according to claim 8, wherein when the 3-dimensional reconstruction is performed on a target area of each image of the image sequence, the initial values of the distortion coefficients are 0, and the target area does not comprise an edge area of the image.

13. The electronic device according to claim 8, wherein the nominal intrinsic parameters of the camera comprise a nominal focal length and a nominal optical center value of the camera.

14. The electronic device according to claim 8, wherein the image sequence is an image sequence collected by crowdsourcing.

15. A non-transitory computer-readable storage medium storing computer instructions, wherein the computer instructions are used to make the computer implement a 3-dimensional reconstruction method, the method comprising:

obtaining an image sequence pre-collected by a camera;

obtaining nominal intrinsic parameters of the camera, and preset initial values of distortion coefficients of the camera, the camera being a camera for collecting the image sequence;

calculating fluctuation ranges of the distortion coefficients, comprising: extracting distorted line features of a part of images in the image sequence; and calculating the fluctuation ranges of the distortion coefficients according to the distorted line features;

performing the 3-dimensional reconstruction on the image sequence based on the nominal intrinsic parameters, the initial values of the distortion coefficients, and the fluctuation ranges of the distortion coefficients; and during the 3-dimensional reconstruction, optimizing an obtained visual point cloud and a camera pose.

16. The non-transitory computer-readable storage medium according to claim 15, wherein the method further comprises:

during the 3-dimensional reconstruction, optimizing a semantic element in the obtained visual point cloud, so that a point cloud of the semantic element meets geometric features corresponding to the semantic element.

* * * * *